US009865258B2

(12) United States Patent
Dreuw

(10) Patent No.: US 9,865,258 B2
(45) Date of Patent: Jan. 9, 2018

(54) METHOD FOR RECOGNIZING A VOICE CONTEXT FOR A VOICE CONTROL FUNCTION, METHOD FOR ASCERTAINING A VOICE CONTROL SIGNAL FOR A VOICE CONTROL FUNCTION, AND APPARATUS FOR EXECUTING THE METHOD

(71) Applicant: Robert Bosch GmbH, Stuttgart (DE)

(72) Inventor: Philippe Dreuw, Heersum (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/156,721

(22) Filed: May 17, 2016

(65) Prior Publication Data
US 2016/0358604 A1   Dec. 8, 2016

(30) Foreign Application Priority Data
Jun. 8, 2015   (DE) .......................... 10 2015 210 430

(51) Int. Cl.
*G10L 15/00*   (2013.01)
*G10L 15/22*   (2006.01)
*G06F 3/01*   (2006.01)
*G10L 15/183*   (2013.01)

(52) U.S. Cl.
CPC .............. *G10L 15/22* (2013.01); *G06F 3/012* (2013.01); *G06F 3/013* (2013.01); *G10L 15/183* (2013.01); *G10L 2015/227* (2013.01)

(58) Field of Classification Search
USPC ................................. 704/231–257, 270–275
See application file for complete search history.

(56) References Cited

U.S. PATENT DOCUMENTS

| | | | | |
|---|---|---|---|---|
| 8,271,262 B1* | 9/2012 | Hsu | ............................ | A61B 5/05 704/206 |
| 2009/0319276 A1* | 12/2009 | Chang | ..................... | G08C 17/00 704/275 |
| 2012/0256967 A1* | 10/2012 | Baldwin | .................. | G06F 3/013 345/684 |
| 2012/0295708 A1* | 11/2012 | Hernandez-Abrego | | ................... A63F 13/424 463/36 |
| 2012/0300061 A1* | 11/2012 | Osman | ................... | G06F 1/3231 348/135 |
| 2013/0307771 A1* | 11/2013 | Parker | ..................... | G06F 3/013 345/158 |

FOREIGN PATENT DOCUMENTS

DE   102011084552   8/2012

* cited by examiner

*Primary Examiner* — Jesse Pullias
(74) *Attorney, Agent, or Firm* — Norton Rose Fulbright US LLP; Gerard Messina

(57) ABSTRACT

A method for recognizing a voice context for a voice control function in a vehicle. The method encompasses reading in a gaze direction datum regarding a current gaze direction of an occupant of the vehicle; allocating the gaze direction datum to a viewing zone in an interior of the vehicle in order to obtain a viewing zone datum regarding a viewing zone currently being viewed by the occupant; and determining, by utilization of the viewing zone datum, a voice context datum regarding a predetermined voice context allocated to the viewing zone currently being viewed.

13 Claims, 4 Drawing Sheets

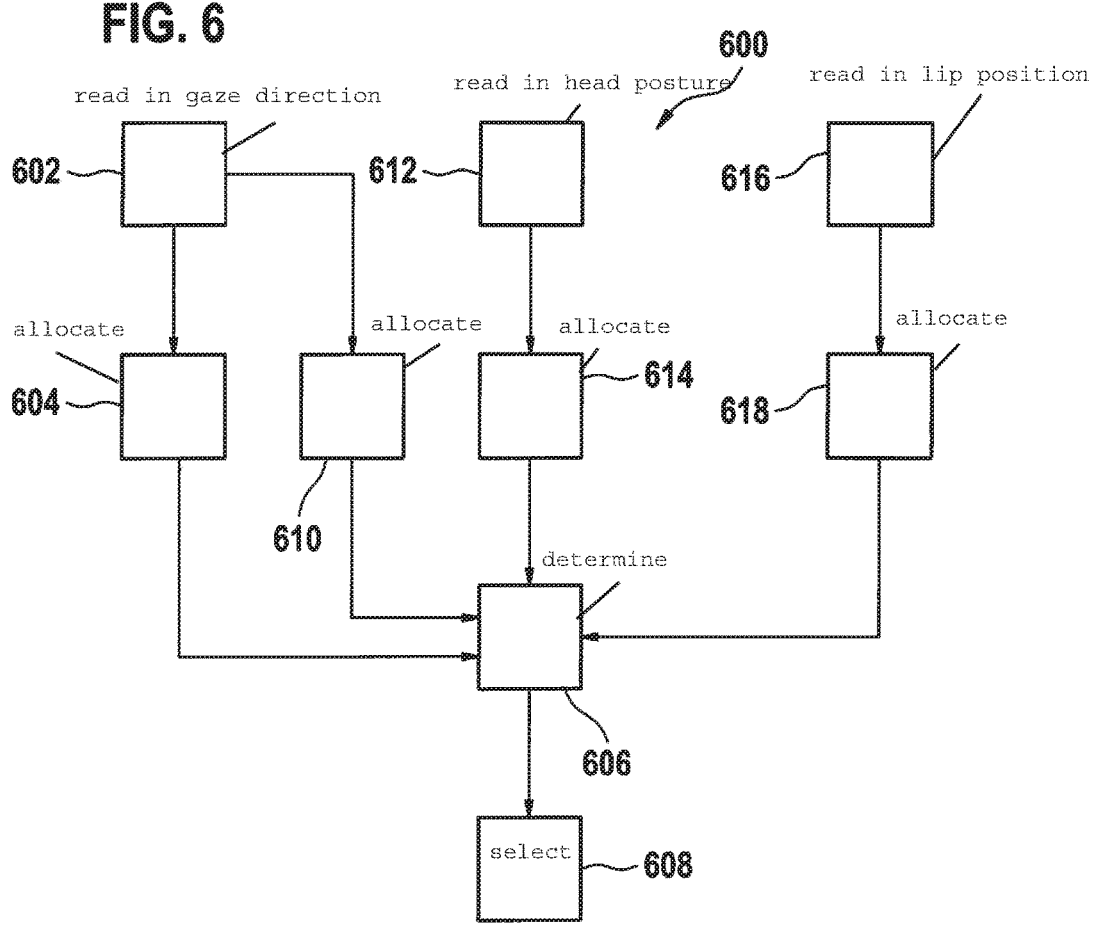
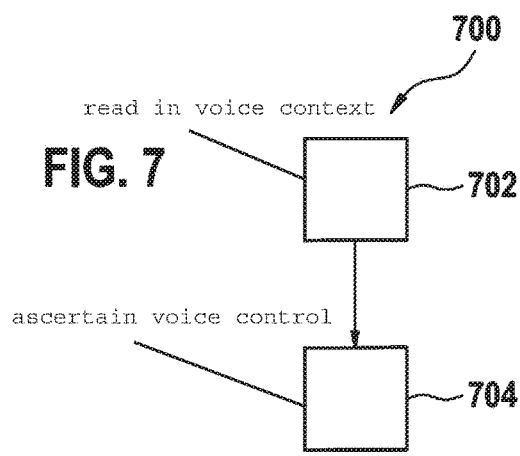

METHOD FOR RECOGNIZING A VOICE CONTEXT FOR A VOICE CONTROL FUNCTION, METHOD FOR ASCERTAINING A VOICE CONTROL SIGNAL FOR A VOICE CONTROL FUNCTION, AND APPARATUS FOR EXECUTING THE METHOD

CROSS REFERENCE

The present application claims the benefit under 35 U.S.C. §119 of German Patent Application No. DE 102015210430.3 filed on Jun. 8, 2015, which is expressly incorporated herein by reference in its entirety.

BACKGROUND INFORMATION

The present invention relates to a method, apparatus, and computer program.

Voice interaction systems are nowadays standard equipment in modern HMI systems in vehicles. With the aid of a voice interaction system a driver of a vehicle can control, for example, a navigation device or an infotainment system of the vehicle with voice commands. Speaker identification and/or voice interaction recognition can be accomplished in audio- and/or video-based fashion, and alternatively or additionally by eye tracking with the aid of an NIR camera.

In more recent voice interaction systems, processing of naturally spoken language, and comprehension thereof, are already being used. These are respectively referred to as "natural language processing" (NLP) and "natural language understanding" (NLU). Natural language interaction systems are notable for the fact that voice control no longer obligatorily requires adherence to inflexible command words and specific sequences of spoken words. German Patent Application No. DE 10 2011 084 552 A1 describes a method for recognizing the vigilance state of a person by a mobile device.

SUMMARY

In accordance with the present invention, an example method for recognizing a voice context for a voice control function, furthermore a method for ascertaining a voice control signal for a voice control function, an apparatus that uses that method, and lastly a corresponding computer program, are provided.

Allocation of a gaze direction datum regarding a gaze direction of a vehicle occupant to a viewing zone in an interior of the vehicle allows a predetermined voice context allocated to the viewing zone to be ascertained.

According to the present invention, of determining, e.g., in camera-based fashion the gaze direction of at least one driver of a vehicle, an anticipated voice interaction recognition domain can be determined at an early point in time in the voice input, or even before the voice input begins.

An example method for recognizing a voice context for a voice control function in a vehicle is provided, the method having the following steps:
reading in a gaze direction datum regarding a current gaze direction of an occupant of the vehicle;
allocating the gaze direction datum to a viewing zone in an interior of the vehicle in order to obtain a viewing zone datum regarding a viewing zone currently being viewed by the occupant; and
determining, by utilization of the viewing zone datum, a voice context datum regarding a predetermined voice context allocated to the viewing zone currently being viewed.

This example method can be implemented, for example, in software or hardware or in a mixed form of software and hardware, for example in a control device.

The voice control function can be executed by a voice interaction system installed in the vehicle. An occupant of the vehicle, e.g. the driver, can use the voice interaction system in order to output voice commands via spoken text, for example in order to control the vehicle's navigation device or infotainment system. The "voice context" can be a voice domain, i.e., a specific sphere of life that is characterized by a specific choice of words. The "gaze direction datum" can involve data that are conveyed with an electrical signal of, for example, a suitable sensor of the vehicle. The current gaze direction can be represented in space by way of a vector and its three-dimensional position. The "viewing zone" can be a region in the interior of the vehicle that is currently being viewed by the occupant. A viewing zone can be a region of the interior of the vehicle that represents a device coupled to the voice interaction system, e.g., the vehicle's navigation device. The navigation device can be located physically or merely virtually in that region. The viewing zone can have different sizes and can represent an icon on a screen as well as, for example, the entire instrument panel region in the vehicle. The "viewing zone datum" can encompass data with regard to a functionality of the viewing zone currently being viewed. For example, the viewing zone datum can supply an indication as to the tasks in the vehicle for which the viewing zone currently being viewed is responsible. The voice context datum can be based on data regarding the voice context allocated to the viewing zone being viewed.

According to an example embodiment of the method, the allocating step can be executed when a predetermined viewing time threshold value is exceeded in the reading-in step, the viewing time being capable of representing a time during which the viewing zone is being viewed by the occupant. It is thereby possible to prevent the voice interaction system from reacting to random glances by the occupant, i.e., viewing by the occupant of a region of the vehicle interior with which the occupant does not associate a desire for voice control.

The allocating step can also only be executed if, in the reading-in step, the gaze direction is determined as a gaze direction at a zone designed for voice recognition. The calculation outlay of the voice interaction system can thereby advantageously be reduced.

In particular, in the allocating step the viewing zone can be selected, by utilization of the gaze direction datum, from a plurality of viewing zones. It is thereby possible to carry out, in a brief time, a filtering of voice domains anticipated for a voice command.

According to a further embodiment the method can have a step of selecting, by utilization of the voice context datum, a predetermined voice model for the voice control function. Advantageously, a recognition rate for the voice control function can thereby be effectively increased.

It is also favorable if the method has a step of allocating the occupant, by utilization of the gaze direction datum, to an occupant category from among a plurality of occupant categories. The voice context datum can correspondingly be further determined in the determining step by utilization of the occupant category allocated to the occupant. Examples of occupant categories can be "driver," "front passenger," "passenger," or the like. In this way as well, an anticipated voice context can be inferred more quickly.

In addition, in the step of allocating the occupant to an occupant category, the occupant can be identified as an individual person. This embodiment likewise enables an improvement in the recognition rate, for example by utilization of stored voice patterns or stored past voice commands.

According to a further embodiment, the method can have a step of reading in a further gaze direction datum regarding a further current gaze direction of a further occupant of the vehicle; a step of allocating the further gaze direction datum to a further viewing zone in the interior of the vehicle in order to obtain a further viewing zone datum regarding a further viewing zone currently being viewed by the further occupant; and a step of determining, by utilization of the further viewing zone datum, a further voice context datum regarding a further predetermined voice context allocated to the further viewing zone currently being viewed. With this embodiment, voice commands of different persons can be quickly and robustly allocated simultaneously or at different times.

The method can furthermore have a step of reading in a head posture datum regarding a current head posture of the occupant of the vehicle; and a step of allocating the head posture datum to the viewing zone in the interior of the vehicle in order to obtain an additional viewing zone datum regarding a viewing zone currently being viewed by the occupant. Correspondingly, the voice context datum can be further determined, in the step of determining a voice context datum regarding a predetermined voice context allocated to the viewing zone currently being viewed, by utilization of the additional viewing zone datum. With this redundant information about the occupants, the method can be made more robust.

Alternatively or additionally, the method can have a step of reading in a lip position datum regarding a current lip position of the occupant of the vehicle; and a step of allocating the lip position datum to the viewing zone in the interior of the vehicle in order to obtain a second additional viewing zone datum regarding a viewing zone currently being viewed by the occupant. The voice context datum can correspondingly be further determined, in the step of determining a voice context datum regarding a predetermined voice context allocated to the viewing zone currently being viewed, by utilization of the second additional viewing zone datum. With this embodiment of the method as well, voice recognition can be implemented more robustly.

An example method for ascertaining a voice control signal for a voice control function in a vehicle is furthermore provided, the method having the following steps:
reading in a voice context datum determined in accordance with an embodiment of the method explained above for recognizing a voice context, and reading in an audio signal; and
ascertaining the voice control signal by utilization of the voice context datum and of the audio signal.

This method can be implemented, for example, in software or hardware or in a mixed form of software and hardware, for example in a control device.

The voice control signal can be an electrical signal for controlling a device, connected to a voice interaction system, of the vehicle. The audio signal can be an electrical signal of an audio sensor of the vehicle. The audio signal can represent a voice element sensed in the vehicle.

According to an example embodiment of the method, in the reading-in step, the audio signal can be read in at least partly from a buffer. The buffer can be embodied to store at least the audio signal for a predetermined time period. It is thereby possible to effectively prevent parts of a voice command from becoming lost in the context of voice recognition.

Also presented is an apparatus that is configured to execute the method for recognizing a voice context for a voice control function and/or the method for ascertaining a voice control signal for a voice control function.

The approach presented here furthermore provides an apparatus that is embodied to respectively carry out, control, and implement the steps of a variant of the method presented here for recognizing a voice context for a voice control function, and/or for ascertaining a voice control signal for a voice control function, in corresponding devices. This variant embodiment of the present invention in the form of an apparatus also allows the object on which the present invention is based to be achieved quickly and efficiently.

An "apparatus" can be understood here as an electrical device that processes sensor signals and, as a function thereof, outputs control signals and/or data signals. The apparatus can have an interface that can be embodied as hardware and/or software. With a hardware embodiment the interfaces can be, for example, part of a so-called system ASIC that contains a wide variety of functions of the apparatus. It is also possible, however, for the interfaces to be separate integrated circuits or to be made up at least partly of discrete components. With a software embodiment the interfaces can be software modules that are present, for example, on a microcontroller alongside other software modules.

Also advantageous is a computer program product or computer program having program code that can be stored on a machine-readable medium or storage medium such as a semiconductor memory, a hard-drive memory, or an optical memory, and can be used to carry out, implement, and/or control the steps of the method according to one of the previously described embodiments, in particular when the program product or program is executed on a computer or an apparatus.

Exemplifying embodiments of the present invention are depicted in the figures and are explained in more detail below

BRIEF DESCRIPTION OF THE DRAWINGS

FIG. 6 is a flow chart of a method for recognizing a voice context for a voice control function, according to an exemplifying embodiment.

FIG. 7 is a flow chart of a method for ascertaining a voice control signal for a voice control function, according to an exemplifying embodiment.

DETAILED DESCRIPTION OF EXAMPLE EMBODIMENTS

Figure 1:
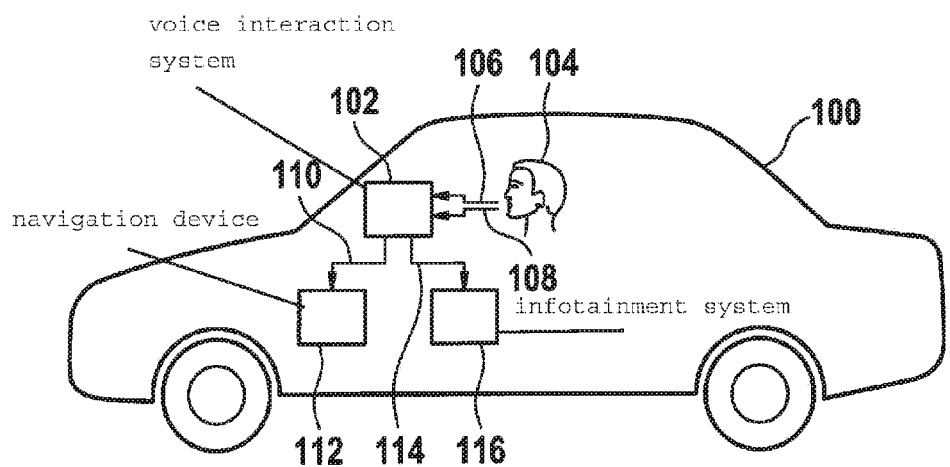
FIG. 1 is a schematic depiction of a vehicle having a voice interaction system, according to an exemplifying embodiment.

In the description below of favorable exemplifying embodiments of the present invention, identical or similar reference characters are used for the elements that are depicted in the various Figures and that function similarly, and repeated description of those elements is omitted.

FIG. 1 is a schematic depiction of a vehicle 100 having a voice interaction system or voice recognition system 102, according to an exemplifying embodiment. Vehicle 100 is a road vehicle such as a passenger car or commercial vehicle. Voice interaction system 102 is embodied to sense voice commands of an occupant 104 (here, of a driver 104) of vehicle 100 and to control, based on the voice commands, devices of vehicle 100 which are coupled to voice interaction system 102.

In the exemplifying embodiment shown in FIG. 1, voice interaction system 102 is embodied to read in a first voice command 106 and a second voice command 108, and in response to first voice command 106 to output a control signal 110 to a navigation device 112 of vehicle 100, and in response to second voice command 108 to output a control signal 114 to an infotainment system 116 of vehicle 100.

Voice interaction systems 102 are nowadays standard equipment in modern HMI systems in vehicles. Most of these systems 102 are at present still based on command-like inputs in which predefined words must be spoken in a prescribed sequence. More recent systems 102 are already able, with NLP (natural language processing) and NLU (natural language understanding) capability, to recognize and interpret naturally spoken language. Here, inflexible command words and specific word sequences no longer obligatorily need to be adhered to.

Voice domain dependence is an aspect common to all statistically based recognition methods used in voice interaction systems 102. The more accurate and restricted the domain, the more specific the statistical voice models that can be used, for example when inputting an address in the context of navigation or inputting an artist and music title within an MP3 collection. The quality of the statistical voice model is essential for the recognition performance of a modern voice recognition system 102.

An objective in a voice-interaction-based HMI system of this kind, which enables natural voice input at the highest level, is to minimize uncertainty regarding the context of the first voice input. For example, in principle any input from a domain supported by system 102 can occur in combination with a press of the "push to talk" button often present on the steering wheel. The intention here is for the initial search space in the voice recognition system to be as small as possible, and furthermore not to have to resort, at this point in time in the input, to generic voice models that can result in poorer recognition rates.

In an embodiment of voice interaction system 102 with audio-based speaker recognition and voice interaction recognition, present-day audio-based methods enable interactive recognition of several speakers in one audio signal and allocation of the speaker. Additionally possible, in combination with a multi-microphone array, is a spatial allocation of the persons who have been recognized; with a stereo microphone array a distinction can be made between a left and a right speaker, and in a mono system without spatial allocation. These methods can moreover be effectively combined with video-based methods and can interpret even spontaneous interactions sufficiently well.

In an additional or alternative embodiment of voice interaction system 102 with video-based speaker recognition and voice interaction recognition, present-day image processing methods make possible, for example on the basis of face recognition methods, both an identification of the speaker and, based on methods for extracting lip position which are often connected therewith, voice detection. Spatial allocation of the speaker even in a context of mono-based image methods is furthermore also already possible. It is also possible, based on a head posture estimate, to identify the direction in which speech is occurring. Depending on the required accuracy this can be determined, via one or more cameras in the vehicle interior, for driver 104 and for all further occupants.

Also advantageous is an implementation of voice interaction system 102 that uses "eye tracking" of occupant 104. Eye tracking can be accomplished with the aid of an NIR camera on the principle of so-called corneal reflection, in which infrared light-emitting diodes sense eye motions by measuring, with millisecond accuracy, the "corneal reflection," i.e. the reflection of the infrared light-emitting diodes in the eyes, or on the cornea of the eyes, of the subject. This corneal reflection method is at present the method used by the majority of eye tracking systems for gaze registration.

Contactless gaze recording additionally requires integration of the pupil, or of the pupil center point, as a further reference point; in other words, the corneal reflection is measured relative to the location of the pupil center point. In order to generate the corneal reflection on the cornea, the subject's eye is irradiated, during reception of the stimuli, with a weak infrared or near-infrared (NIR) light that proceeds from light-emitting diodes integrated into the eye tracking monitor of system 102. At the same time, the infrared-sensitive LED cameras sense the subject's eyes.

From the eye tracker's point of view the pupils appear as small black discs that are surrounded by a colored outer ring (the iris) and are bounded by a white oval (the eyeball) and the upper and lower eyelids. It is in fact these structures that serve as the basis for gaze recording. The eye tracking software processes the subject's pupil as the darkest point (since the pupil almost completely absorbs the incident infrared light), and the corneal reflection as the brightest point (because of the high proportion of reflected infrared light). This result is then processed, typically as a black-and-white video image, by the eye tracker's analysis software.

The present invention may allow all or some of the methods explained above to be combined with one another, so as thereby always to ensure a spatial allocation of speakers 104 in vehicle 100 and to recognize their gaze direction and/or speaking direction. The "push to talk" button that is still used nowadays can thus, for example, optionally be made obsolete. In particular, however, the anticipated domain in the voice recognition system can be determined on the basis of the gaze direction datum for speaker 104. For example, if driver 104 is looking at a navigation icon 112 and begins to speak, system 102 recognizes this and interprets the input as, for example, an address input. If driver 104 (or another occupant) is looking, for example, at an icon of the music collection and begins to speak, the input is interpreted as a music search.

Figure 2:
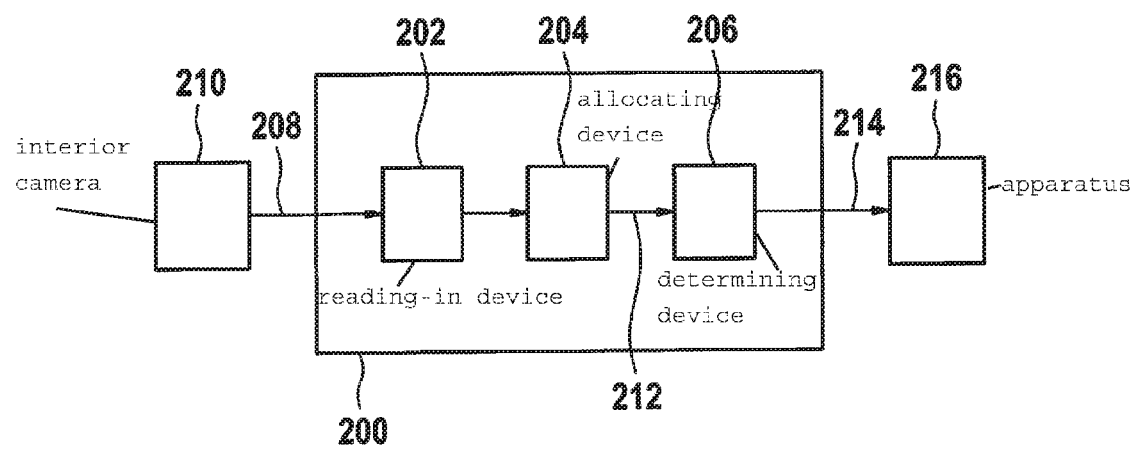
FIG. 2 is a block diagram of an apparatus for recognizing a voice context for a voice control function, according to an exemplifying embodiment.

FIG. 2 is a block diagram of an apparatus 200 for recognizing a voice context for a voice control function in a vehicle, according to an exemplifying embodiment. Apparatus 200 is part of the voice interaction system shown in FIG. 1 or is coupled or couplable to the voice interaction system via a wiring system of the vehicle. Apparatus 200 encompasses a reading-in device 202, an allocating device 204, and a determining device 206.

Reading-in device 202 is embodied to sense a gaze direction datum 208 regarding a current gaze direction of an occupant of the vehicle, for example of the driver. According to an exemplifying embodiment, gaze direction datum 208 is furnished from an interior camera 210 of the vehicle via a suitable interface, in the form of an electrical signal, to reading-in device 202.

Allocating device 204 is embodied to allocate gaze direction datum 208, by utilization of a suitable algorithm, to a viewing zone of a plurality of viewing zones in an interior of the vehicle. According to exemplifying embodiments, position data of the viewing zone and of the optional further viewing zones are stored in apparatus 200 or in a device, coupled to apparatus 200, of the vehicle. Allocating device 204 is embodied to create a viewing zone datum 212 regarding a viewing zone currently being viewed by the occupant, and to furnish it to determining device 206.

Determining device 206 is embodied to determine, by utilization of viewing zone datum 212, a voice context datum 214 regarding a predetermined voice context allocated to the viewing zone currently being viewed, and to furnish it via a suitable interface to an apparatus 216 for ascertaining a voice control signal for a voice control function of the voice interaction system.

Figure 3:
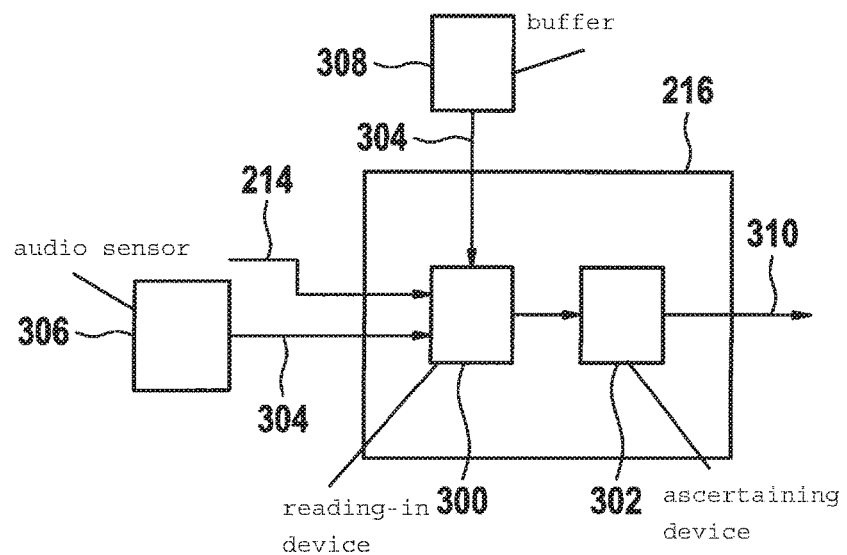
FIG. 3 is a block diagram of an apparatus for ascertaining a voice control signal for a voice control function, according to an exemplifying embodiment.

FIG. 3 is a block diagram of an exemplifying embodiment of apparatus 216 for ascertaining a voice control signal for a voice control function in a vehicle. Apparatus 216 is part of the voice interaction system shown in FIG. 1 or is coupled or couplable to the voice interaction system via a wiring system of the vehicle, and encompasses a reading-in device 300 and an ascertaining device 302.

Reading-in device 300 is embodied to read in voice context datum 214 as well as an audio signal 304 of an audio sensor 306 of the vehicle. According to an exemplifying embodiment reading-in device 300 is furthermore embodied to read in audio signal 304 at least partly from a buffer memory or buffer 308 coupled to reading-in device 300, in order to ensure that audio signal 304 is available in complete form for the voice control function. Buffer 308 is embodied to buffer audio signal 304 for a predetermined period of time. Buffer 308 can be embodied for that purpose, for example, as a ring buffer.

Ascertaining device 302 is embodied to generate and furnish, by utilization of voice context datum 214 and audio signal 304, a voice control signal 310 for voice control of a device of the vehicle coupled to a voice interaction system of the vehicle.

Figure 4:
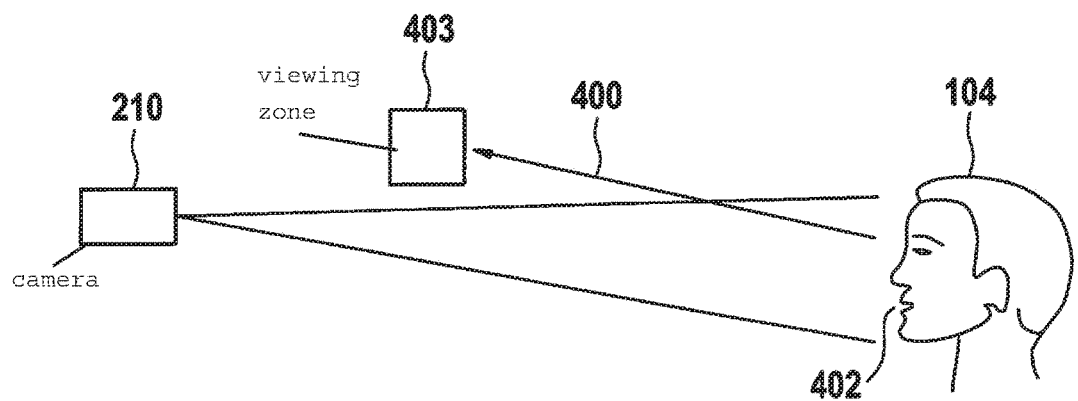
FIG. 4 is a schematic depiction to explain sensor-based sensing of a gaze direction datum and a lip position datum, according to an exemplifying embodiment.

FIG. 4 is a schematic depiction to explain video-based voice recognition and gaze direction recognition for context recognition in natural language interaction systems.

The optical sensor of interior camera 210 of a vehicle is directed onto occupant or occupants 104 and is embodied to sense at least the facial region that contains the eyes and optionally the lips. Camera 210 operates in the near infrared and is therefore also referred to hereinafter as NIR camera 210. In addition to NIR camera 210, further NIR cameras can also be provided for sensing occupant 104 in the vehicle interior.

In the exemplifying embodiment shown in FIG. 4 the optical sensor of NIR camera 210 is embodied to sense both the eye region and the lip region of occupant 104, here of driver 104. Camera 210 correspondingly senses a current gaze direction 400 and a current lip position 402 of occupant 104. In the exemplifying embodiment shown in FIG. 4, driver 104 is looking in gaze direction 400 at an exemplifying viewing zone 403 in the vehicle interior. Viewing zone 403 can be the vehicle's navigation device or an icon for the vehicle's navigation device.

NIR camera 210 furnishes the gaze direction datum based on the current gaze direction 400, and a lip position datum based on the current lip position 402, to the apparatus for recognizing a voice context for a voice control function in a vehicle.

NIR camera 210 or a further camera can optionally be embodied also to sense a head posture of occupant 104 and to furnish a suitable head posture datum to the apparatus for recognizing a voice context.

The at least one NIR interior camera 210 is directed at driver 104 in such a way that at least the eye region of the face becomes visible in the image region. Based on an image analysis and on previously known image processing methods, a calculation unit of NIR camera 210 determines gaze direction 400 and its resulting three-dimensional position in the vehicle. For example, the calculation unit interprets the grayscale image resulting from the optical sensing, and determines gaze direction 400 and possibly lip position 402 and/or the head posture of the driver. In the exemplifying embodiment shown in FIG. 4, lip position 402 and the overall location of the head with reference to the vehicle interior are also calculated. The calculation unit thus determines, at least for driver 104, when and where, or in which direction in the vehicle, he or she is looking and optionally speaking.

The datum regarding the three-dimensional gaze direction 400 is then further interpreted by the apparatus for recognizing a voice context in order to determine icons located therebeneath of an HMI system, or also freely definable zones in the vehicle interior. If the deduced zone permits a voice input, then upon exceedance of a certain gaze time at that zone an event is triggered which informs the voice recognition system as to the context and the anticipated voice domain, in order optionally to load specific voice models therefor into the memory of the voice recognition system.

Alternatively, several persons are also evaluated by the above-described sensor configuration. Gaze direction 400, head postures, lip analysis, or even identity are then correspondingly allocated based on face recognition. This has the advantage that different persons can perform their voice inputs in different contexts. For example, driver 104 can perform voice inputs in the navigation context, and the front passenger in the infotainment context.

In addition, according to exemplifying embodiments, the spatial information regarding occupants, identities, and voice activity can be made available via an interface to external services in order to further improve their quality, for example the quality of a speaker-dependent voice recognition function. Conclusions as to driver attentiveness can thereby also already be drawn.

Furthermore, by way of the analysis of gaze direction 400 further driver assistance systems can be prepared for impending queries or can themselves actively submit proposals regarding ongoing events in or around the vehicle. These proposals can furthermore, in combination with a modern audio management system, be routed individually to the respective occupants or presented in correspondingly provided displays.

In addition, personalized audio-based driver information services such as "text to speech"—e.g. automatic reading of incoming SMS messages or emails—can now be controlled in both situation-dependent fashion (i.e. who is presently sitting in the vehicle, who asked a question, etc.) and in attention-based fashion (i.e., would an interactive notification be perceived as an irritant, an alert, etc.).

A further alternative provides for provision of a dedicated object or a dedicated zone in the vehicle for voice input. For example, looking at an information display or also at a highlighted point on the instrument panel could activate voice input. This mode could then be referred to as "talk to me" or "look to talk."

Figure 5:
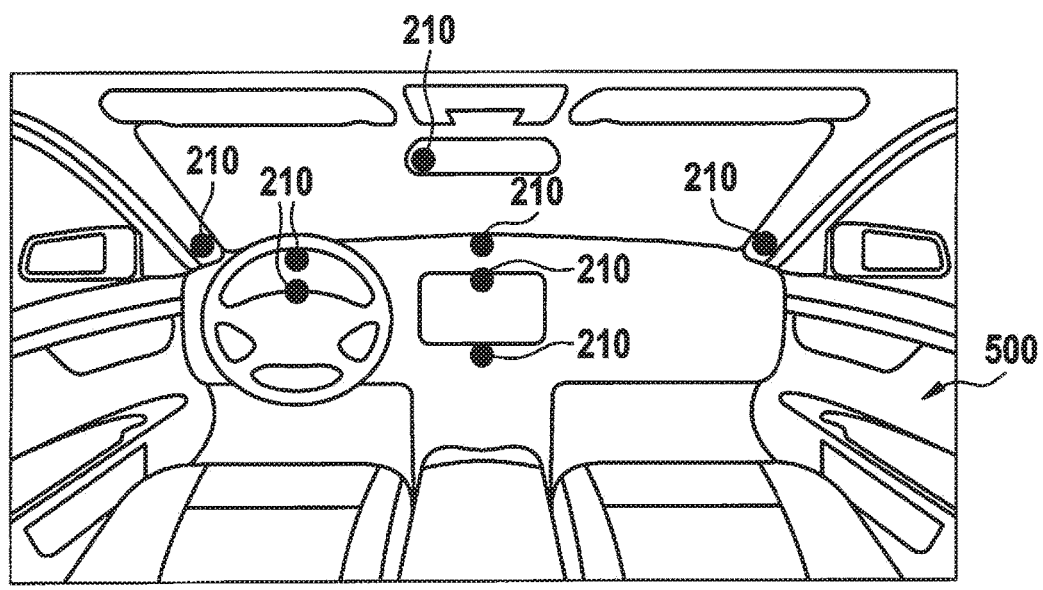
FIG. 5 depicts a vehicle interior with a plurality of possible camera positions, according to an exemplifying embodiment.

As described above, several NIR cameras 210 can be used in different regions in the vehicle for occupant observation. FIG. 5 shows in this regard, in perspective, an example of an interior 500 of a vehicle in which eight NIR cameras 210 are used. Their respective positions in the vehicle interior are marked in the depiction with dots.

According to an exemplifying embodiment, the headrests (not shown in FIG. 5) of the front seats can also have NIR cameras 210 for analysis and monitoring of the rear-seat passengers. It is particularly important that the face and eye region be respectively located in the field of view of camera 210, optionally also the lip region as well as the entire head, so that the exact gaze direction and possibly the lip position and/or head position at least of the driver can be ascertained.

FIG. 6 is a flow chart of an exemplifying embodiment of a method 600 for recognizing a voice context for a voice control function in a vehicle. Method 600 can be executed by the apparatus shown in FIG. 2 for recognizing a voice context for a voice control function.

In a reading-in step 602 a gaze direction datum regarding a current gaze direction of an occupant of the vehicle is read in. In an allocating step 604 the gaze direction datum is allocated to a viewing zone in an interior of the vehicle in order to obtain a viewing zone datum regarding a viewing zone currently being viewed by the occupant. In a determining step 606 a voice context datum regarding a predetermined voice context allocated to the viewing zone currently being viewed is determined by utilization of the viewing zone datum.

According to an exemplifying embodiment of the method 600, in the allocating step 604 the viewing zone is selected from a plurality of viewing zones.

In principle the allocating step 604 can be executed as a function of whether the gaze direction is recognized, in the reading-in step 602, as a gaze direction at a zone intended for voice recognition.

According to a further exemplifying embodiment of method 600 the allocating step 604 is only executed if, in the reading-in step 602, a predetermined gaze time threshold value of a gaze time at the viewing zone is exceeded. Only a specific region of the vehicle interior can then also be defined as a viewing zone.

The method can furthermore have a selecting step 608 in which a predetermined voice model for the voice control function is selected, by utilization of the voice context datum, from a plurality of voice models of a voice interaction system of the vehicle.

In an exemplifying refinement the method 600 can have a step of allocating 610 the occupant, by utilization of the gaze direction datum, to one of a variety of occupant categories. The voice context datum is then furthermore determined in the determining step 608 by utilization of the occupant category allocated to the occupant.

According to a further exemplifying embodiment the method 600 can have a step of reading in 612 a head posture datum regarding a current head posture of the occupant; and a step of allocating 614 the head posture datum to the viewing zone in the interior of the vehicle in order to obtain an additional viewing zone datum regarding the viewing zone currently being viewed by the occupant. The voice context datum is then further determined in the determining step 606 by utilization of the additional viewing zone datum.

In a further variant the method 600 can have a step of reading in 616 a lip position datum regarding a current lip position of the occupant; and a step of allocating 618 the lip position datum to the viewing zone in order to obtain a second additional viewing zone datum regarding the viewing zone currently being viewed by the occupant. The voice context datum is then further determined in the determining step 606 by utilization of the second additional viewing zone datum.

The method 600 can of course be executed for several occupants of the vehicle. The method sequence is then executed in one of the aforementioned variants simultaneously for several or all occupants of the vehicle.

The method 600 enables, for example, a camera-based determination of the gaze direction at least of the driver, better of all vehicle occupants. Optionally, the head position and lip position can also be recognized. Context recognition is made possible by ascertainment of the gaze direction and optionally of the head posture. In combination with an optional analysis of lip position over time, a spatial allocation of voice activity in the vehicle is possible.

Thanks to analysis of the gaze direction and derivation of a context, voice models of a modern NLP system can be preloaded in the background, and they then result in appreciably better results for recognition of a voice input. Voice recognition performance can moreover thereby be accelerated, since the search space within the voice recognition system is limited and the results become more unequivocal, so that modern acceleration methods in voice recognition, called "pruning" techniques, can function better.

FIG. 7 shows, in this connection, a flow chart of an exemplifying embodiment of a method 700 for ascertaining a voice control signal for a voice control function in a vehicle. The method 700 can be executed by the apparatus shown in FIG. 3 for ascertaining a voice control signal for a voice control function in a vehicle. In a reading-in step 702 a voice context datum determined in accordance with a variant of the method 600 for recognizing a voice context, and an audio signal of an audio sensor of the vehicle, are read in. In an ascertaining step 704 the voice control signal is ascertained by utilization of the voice context datum and of the audio signal.

According to an exemplifying embodiment of the method 700, in the reading-in step 702 the audio signal is read in at least partly from a buffer for buffering the audio signal.

The method 700 can be combined with an audio-based method for speaker recognition and/or voice recognition, in order both to improve the spatial allocation of the vehicle occupants participating in the voice input and to better recognize the content of the interaction. A further calculation unit then recognizes, based on the audio signal, both the identity of the speaker and the content of what is being spoken. As described above, this has the advantage that different persons can perform their voice inputs in different contexts.

The method 600 ascertains, by way of the at least one interior camera or another sensor that enables extraction of the viewing direction, the exact viewing direction and optionally also the head posture and identity of the occupants. By way of lip detection and analysis over time of this region in the image, it is possible to ascertain whether the respective person is speaking. By combining all the recognized occupants, their voice activity, and their physical allocation, the occupants can already be allocated to an interaction even though its content is not understood or detected.

Upon a voice input, the gaze direction existing at that point in time (or also shortly beforehand) at an icon or at a zone within the vehicle is then used in order to recognize the anticipated voice domain. A sensor supplies the three-dimensional position, required for that purpose, of the gaze direction in the vehicle. The corresponding icon of an operating unit, for example a navigation symbol or a symbol for a music collection, or even a general zone such as the windshield or rear window, is then derived from that position. The voice recognition system thus can prepare for the input that may be imminent, and can load corresponding voice models into the memory, even before actual activation.

This process can occur continuously in the background based on gaze direction recognition. Recognition of the head posture can optionally also be sufficient for this, for example for very large zones in the vehicle interior. Activation of the actual voice recognition function can be accomplished in conventional fashion with a "push to talk" button.

Alternatively, however, the present invention described herein also allows activation based on a combination of gaze direction, gaze dwell time, and voice detection based on an analysis over time of lip position. If the time during which the gaze dwells at a specific zone exceeds a certain threshold value, and if the lip analysis indicates voice activity, the audio signal can then be interpreted as a voice input with no need to press a button for that purpose. Activation becomes robust only as a result of lip analysis, since otherwise, in a context of extended gaze times, any audio signals existing at that point in time, for example music playing in the vehicle interior, would also be interpreted as voice input.

According to an exemplifying embodiment, in order to prevent the beginning of the voice input from being lost in the context of this form of activation, upon exceedance of the gaze times a small ring buffer is already filled with any existing audio signals. If lip analysis then indicates voice activity, the actual voice buffer is then initialized with the contents of the smaller ring buffer and continues to filled, ultimately being processed by the voice recognition system. The end of the voice input is recognized by way of conventional signal processing methods ("start/stop detection").

If the video-based method 700 is now combined with an audio-based method, the content of an interaction with (possibly) several participants can then additionally be understood. The accuracy with which occupants are identified can furthermore possibly be improved thereby.

The methods 600, 700 described here can be combined with a vehicle- and surroundings-related sensor suite. If this sensor suite establishes that a discussion break would be opportune, for example so that the situation can be assessed better from the driver's point of view, the driver assistance system can indicate this.

The example embodiments of the present invention described herein, of using the gaze direction for simultaneous activation and improvement of recognition performance in the context of voice control, may be suitable for effectively improving the performance of natural language interaction systems in the automotive sector.

When an exemplifying embodiment encompasses an "and/or" correlation between a first feature and a second feature, this is to be read to mean that according to one embodiment the exemplifying embodiment has both the first feature and the second feature, and according to a further embodiment has either only the first feature or only the second feature.

What is claimed is:

1. A method for ascertaining a voice control signal for a voice control function in a vehicle, the method comprising:
   reading in a voice context datum, the voice context datum being determined by:
      reading in a gaze direction datum regarding a current gaze direction of an occupant of the vehicle,
      allocating the gaze direction datum to a viewing zone of a plurality of viewing zones, each of the plurality of viewing zones corresponding to a different region, in an interior of the vehicle to obtain a viewing zone datum regarding a viewing zone currently being viewed by the occupant, and
      determining, by using the viewing zone datum, the voice context datum regarding a predetermined voice context allocated to the viewing zone currently being viewed,
      reading in a further gaze direction datum regarding a further current gaze direction of a further occupant of the vehicle;
      allocating the further gaze direction datum to a further viewing zone in the interior of the vehicle to obtain a further viewing zone datum regarding a further viewing zone currently being viewed by the further occupant; and
      determining, by using the further viewing zone datum, a further voice context datum regarding a further predetermined voice context allocated to the further viewing zone currently being viewed;
   reading in an audio signal; and
   ascertaining the voice control signal by using the voice context datum and the audio signal;
   wherein the allocating is executed when a predetermined viewing time threshold value is exceeded in the reading-in, the viewing time representing a time during which the viewing zone is being viewed by the occupant.

2. The method as recited in claim 1, wherein in the allocating step, the viewing zone is selected, by using the gaze direction datum, from a plurality of viewing zones.

3. The method as recited in claim 1, further comprising:
   selecting, by using the voice context datum, a predetermined voice model for the voice control function.

4. The method as recited in claim 3, further comprising:
   allocating the occupant, by using the gaze direction datum, to an occupant category from among a plurality of occupant categories, the voice context datum being further determined in the determining step by using the occupant category allocated to the occupant.

5. The method as recited in claim 4, wherein in the allocating the occupant to an occupant category step, the occupant is identified as an individual person.

6. The method as recited in claim 1, further comprising:
   reading in a head posture datum regarding a current head posture of the occupant of the vehicle; and
   allocating the head posture datum to the viewing zone in the interior of the vehicle to obtain an additional viewing zone datum regarding a viewing zone currently being viewed by the occupant, the voice context datum being further determined, in the step of determining a voice context datum regarding a predetermined voice context allocated to the viewing zone currently being viewed, by using the additional viewing zone datum.

7. The method as recited in claim 1, further comprising:
   reading in a lip position datum regarding a current lip position of the occupant of the vehicle; and allocating the lip position datum to the viewing zone in the interior of the vehicle to obtain a second additional viewing zone datum regarding a viewing zone currently being viewed by the occupant, the voice context datum being further determined, in the step of determining a voice context datum regarding a predetermined voice context allocated to the viewing zone currently being viewed, by using the second additional viewing zone datum.

8. The method as recited in claim 1, wherein in reading in of the audio signal step, the audio signal is read in at least partly from a buffer, the buffer being embodied to store at least the audio signal for a predetermined time period.

9. A method for recognizing a voice context for a voice control function in a vehicle, the method comprising:
reading in a gaze direction datum regarding a current gaze direction of an occupant of the vehicle;
allocating the gaze direction datum to a viewing zone in an interior of the vehicle to obtain a viewing zone datum regarding a viewing zone currently being viewed by the occupant;
determining, by using the viewing zone datum, a voice context datum regarding a predetermined voice context allocated to the viewing zone currently being viewed;
reading in a further gaze direction datum regarding a further current gaze direction of a further occupant of the vehicle;
allocating the further gaze direction datum to a further viewing zone in the interior of the vehicle to obtain a further viewing zone datum regarding a further viewing zone currently being viewed by the further occupant; and
determining, by using the further viewing zone datum, a further voice context datum regarding a further predetermined voice context allocated to the further viewing zone currently being viewed.

10. An apparatus for recognizing a voice context for a voice control function in a vehicle, comprising:
a read-in arrangement to read in a gaze direction datum regarding a current gaze direction of an occupant of the vehicle;
an allocating arrangement to allocate the gaze direction datum to a viewing zone of a plurality of viewing zones, each of the plurality of viewing zones corresponding to a different region, in an interior of the vehicle to obtain a viewing zone datum regarding a viewing zone currently being viewed by the occupant; and
a determining arrangement to determine, by using the viewing zone datum, a voice context datum regarding a predetermined voice context allocated to the viewing zone currently being viewed;
wherein the allocating is executed when a predetermined viewing time threshold value is exceeded in the reading-in, the viewing time representing a time during which the viewing zone is being viewed by the occupant,
wherein the reading in arrangement is further configured to read in a further gaze direction datum regarding a further current gaze direction of a further occupant of the vehicle, wherein the allocating arrangement is further configured to allocate the further gaze direction datum to a further viewing zone in the interior of the vehicle to obtain a further viewing zone datum regarding a further viewing zone currently being viewed by the further occupant; and wherein the determining arrangement is further configured to determine, by using the further viewing zone datum, a further voice context datum regarding a further predetermined voice context allocated to the further viewing zone currently being viewed.

11. An apparatus for ascertaining a voice control signal for a voice control function in a vehicle, comprising:
a first reading arrangement to read in a voice context datum, the voice context datum being determined by performing the following:
reading in, via a reading in arrangement, a gaze direction datum regarding a current gaze direction of an occupant of the vehicle,
allocating, via an allocating arrangement, the gaze direction datum to a viewing zone of a plurality of viewing zones, each of the plurality of viewing zones corresponding to a different region, in an interior of the vehicle to obtain a viewing zone datum regarding a viewing zone currently being viewed by the occupant, and
determining, via a determining arrangement, by using the viewing zone datum, the voice context datum regarding a predetermined voice context allocated to the viewing zone currently being viewed,
a second reading arrangement to read in an audio signal; and
an ascertaining arrangement to ascertain the voice control signal by using the voice context datum and the audio signal;
wherein the allocating is executed when a predetermined viewing time threshold value is exceeded in the reading-in, the viewing time representing a time during which the viewing zone is being viewed by the occupant,
wherein the reading in arrangement is further configured to read in a further gaze direction datum regarding a further current gaze direction of a further occupant of the vehicle, wherein the allocating arrangement is further configured to allocate the further gaze direction datum to a further viewing zone in the interior of the vehicle to obtain a further viewing zone datum regarding a further viewing zone currently being viewed by the further occupant; and wherein the determining arrangement is further configured to determine, by using the further viewing zone datum, a further voice context datum regarding a further predetermined voice context allocated to the further viewing zone currently being viewed.

12. A machine-readable non-transitory storage medium storing a computer program, which is executable by a processor, comprising:
a program code arrangement having program code for recognizing a voice context for a voice control function in a vehicle, by performing the following:
reading in, via a reading in arrangement, a gaze direction datum regarding a current gaze direction of an occupant of the vehicle;
allocating, via an allocating arrangement, the gaze direction datum to a viewing zone of a plurality of viewing zones, each of the plurality of viewing zones corresponding to a different region, in an interior of the vehicle to obtain a viewing zone datum regarding a viewing zone currently being viewed by the occupant;
determining, via a determining arrangement, by using the viewing zone datum, a voice context datum regarding a predetermined voice context allocated to the viewing zone currently being viewed;

reading in, via the reading in arrangement, a further gaze direction datum regarding a further current gaze direction of a further occupant of the vehicle;

allocating, via the allocating arrangement, the further gaze direction datum to a further viewing zone in the interior of the vehicle to obtain a further viewing zone datum regarding a further viewing zone currently being viewed by the further occupant; and determining, via the determining arrangement, by using the further viewing zone datum, a further voice context datum regarding a further predetermined voice context allocated to the further viewing zone currently being viewed;

wherein the allocating is executed when a predetermined viewing time threshold value is exceeded in the reading-in, the viewing time representing a time during which the viewing zone is being viewed by the occupant.

13. A machine-readable non-transitory storage medium storing a computer program, which is executable by a processor, comprising:

a program code arrangement having program code for ascertaining a voice control signal for a voice control function in a vehicle, by performing the following:

a first reading arrangement to read in a voice context datum, the voice context datum being determined by performing the following:

reading in, via a reading in arrangement, a gaze direction datum regarding a current gaze direction of an occupant of the vehicle, allocating, via an allocating arrangement, the gaze direction datum to a viewing zone of a plurality of viewing zones, each of the plurality of viewing zones corresponding to a different region, in an interior of the vehicle to obtain a viewing zone datum regarding a viewing zone currently being viewed by the occupant, and determining, via a determining arrangement, by using the viewing zone datum, the voice context datum regarding a predetermined voice context allocated to the viewing zone currently being viewed, a second reading arrangement to read in an audio signal; and an ascertaining arrangement to ascertain the voice control signal by using the voice context datum and the audio signal;

wherein the allocating is executed when a predetermined viewing time threshold value is exceeded in the reading-in, the viewing time representing a time during which the viewing zone is being viewed by the occupant, wherein the reading in arrangement is further configured to read in a further gaze direction datum regarding a further current gaze direction of a further occupant of the vehicle, wherein the allocating arrangement is further configured to allocate the further gaze direction datum to a further viewing zone in the interior of the vehicle to obtain a further viewing zone datum regarding a further viewing zone currently being viewed by the further occupant; and wherein the determining arrangement is further configured to determine, by using the further viewing zone datum, a further voice context datum regarding a further predetermined voice context allocated to the further viewing zone currently being viewed.

* * * * *